(12) United States Patent
Xue et al.

(10) Patent No.: US 12,382,345 B2
(45) Date of Patent: Aug. 5, 2025

(54) METHOD FOR ADAPTIVELY CONFIGURING TRANSMISSION OF DATA FLOWS

(71) Applicant: ZTE Corporation, Guangdong (CN)

(72) Inventors: Yan Xue, Guangdong (CN); Feng Xie, Guangdong (CN)

(73) Assignee: ZTE Corporation, Shenzhen (CN)

( * ) Notice: Subject to any disclaimer, the term of this patent is extended or adjusted under 35 U.S.C. 154(b) by 424 days.

(21) Appl. No.: 17/859,219

(22) Filed: Jul. 7, 2022

(65) Prior Publication Data

US 2023/0055739 A1 Feb. 23, 2023

Related U.S. Application Data

(63) Continuation of application No. PCT/CN2020/071784, filed on Jan. 13, 2020.

(51) Int. Cl.
*H04W 28/24* (2009.01)

(52) U.S. Cl.
CPC .................. *H04W 28/24* (2013.01)

(58) Field of Classification Search
CPC .................................................. H04W 28/24
See application file for complete search history.

(56) References Cited

U.S. PATENT DOCUMENTS

| | | | | |
|---|---|---|---|---|
| 7,966,648 B2 * | 6/2011 | Park | ...................... | H04W 12/08 |
| | | | | 709/225 |
| 8,139,606 B2 * | 3/2012 | Bekele | .................. | H04L 47/762 |
| | | | | 370/468 |
| 8,842,578 B1 * | 9/2014 | Zisapel | ................... | H04L 41/22 |
| | | | | 370/255 |

(Continued)

FOREIGN PATENT DOCUMENTS

| | | | |
|---|---|---|---|
| CN | 101345990 A | 1/2009 | |
| CN | 101939968 A | 1/2011 | |
| CN | 108123778 A | 6/2018 | |
| CN | 108605254 A | 9/2018 | |
| CN | 110362314 A | 10/2019 | |
| CN | 110383885 A | 10/2019 | |
| CN | 110461012 A | 11/2019 | |
| EP | 2984795 B1 * | 7/2019 | ............ H04L 41/22 |
| WO | WO 2019/126931 A1 | 7/2019 | |

OTHER PUBLICATIONS

Supplementary European Search Report, dated Jun. 14, 2023, pp. 1-12, issued in European Application No. 20888037.7, European Patent Office, Munich, Germany.

(Continued)

*Primary Examiner* — Hai V Nguyen
(74) *Attorney, Agent, or Firm* — Crowell & Moring LLP

(57) ABSTRACT

This disclosure generally relates configuration of transmission profile of data flows in communication networks and particularly relates to configuration of Quality of Service (QoS) profile for QoS flows. In some implementations, a first network element in the communication network may be configured to determine a plurality of transmission profiles for a data flow and transmit these profiles to a second network element. The second network element may adaptively select an active transmission profile from the plurality of transmission profiles for configuring the transmission of the data flow. The second network element may further modify the active transmission profile from the plurality of transmission profiles during an active transmission of the data flow without involving additional decision by the first network element.

20 Claims, 5 Drawing Sheets

(56) References Cited

U.S. PATENT DOCUMENTS

| | | | | |
|---|---|---|---|---|
| 8,982,713 | B2* | 3/2015 | Balasubramanian | H04W 28/24 370/252 |
| 9,043,862 | B2* | 5/2015 | Ahmavaara | H04W 80/04 726/1 |
| 9,628,384 | B2* | 4/2017 | Kalkunte | H04L 45/72 |
| 9,642,040 | B2* | 5/2017 | Ho | H04W 24/02 |
| 9,998,565 | B2* | 6/2018 | Gupta | H04L 43/0876 |
| 10,122,547 | B2* | 11/2018 | Mahindra | H04L 47/2441 |
| 10,218,590 | B2* | 2/2019 | Gupta | H04L 43/06 |
| 10,574,763 | B2* | 2/2020 | Sarangapani | H04L 67/142 |
| 10,609,546 | B2* | 3/2020 | Panchal | H04L 47/56 |
| 10,637,725 | B2* | 4/2020 | Li | H04L 41/40 |
| 10,764,945 | B2* | 9/2020 | Iwai | H04W 76/12 |
| 10,831,509 | B2* | 11/2020 | Ravid | G06F 9/4494 |
| 11,005,741 | B2* | 5/2021 | Rasanen | H04W 28/0205 |
| 11,080,067 | B2* | 8/2021 | Ravid | G06F 9/44505 |
| 11,134,410 | B2* | 9/2021 | Wang | H04L 67/306 |
| 11,165,873 | B2* | 11/2021 | Draznin | H04W 8/04 |
| 11,178,057 | B2* | 11/2021 | Yu | H04W 28/20 |
| 11,184,084 | B2* | 11/2021 | Panchal | H04B 7/1855 |
| 11,202,193 | B2* | 12/2021 | Panchal | H04W 40/12 |
| 11,223,976 | B2* | 1/2022 | Young | H04W 28/18 |
| 11,496,573 | B2* | 11/2022 | Dao | H04W 48/04 |
| 11,533,669 | B2* | 12/2022 | Maino | H04W 28/0268 |
| 11,564,084 | B2* | 1/2023 | Xue | H04W 92/20 |
| 11,582,313 | B2* | 2/2023 | Dao | H04W 48/04 |
| 11,595,845 | B2* | 2/2023 | Dao | H04W 80/10 |
| 11,606,825 | B2* | 3/2023 | Iwai | H04W 8/28 |
| 11,658,904 | B1* | 5/2023 | Vasseur | H04L 45/70 709/238 |
| 11,665,097 | B2* | 5/2023 | Carames | H04L 45/745 370/235 |
| 11,677,492 | B2* | 6/2023 | Yu | H04L 1/0015 370/328 |
| 11,683,393 | B2* | 6/2023 | Li | H04L 67/59 709/202 |
| 11,729,854 | B2* | 8/2023 | Bharatia | H04W 76/15 455/435.1 |
| 11,818,576 | B2* | 11/2023 | Sardesai | H04W 72/542 |
| 11,832,123 | B2* | 11/2023 | Gangakhedkar | H04M 15/8016 |
| 11,882,234 | B2* | 1/2024 | Xu | H04M 15/66 |
| 11,895,527 | B2* | 2/2024 | Huang | H04W 92/20 |
| 11,910,379 | B2* | 2/2024 | Macias | H04W 64/00 |
| 11,929,880 | B2* | 3/2024 | Abboud | H04L 41/14 |
| 11,947,978 | B2* | 4/2024 | Gould | G06F 16/28 |
| 11,950,127 | B2* | 4/2024 | De Andrade Jardim | H04L 47/283 |
| 11,950,128 | B2* | 4/2024 | Ali | H04W 28/0273 |
| 11,968,537 | B2* | 4/2024 | Sharma | H04W 12/122 |
| 11,968,566 | B2* | 4/2024 | Parvataneni | H04L 41/085 |
| 11,985,520 | B2* | 5/2024 | Ramamurthi | H04L 43/0876 |
| 12,003,384 | B2* | 6/2024 | Lair | H04L 43/04 |
| 12,016,077 | B2* | 6/2024 | Panchal | H04W 72/543 |
| 12,021,789 | B2* | 6/2024 | Barac | H04J 11/0056 |
| 12,041,481 | B2* | 7/2024 | Wang | H04L 47/20 |
| 2007/0286117 | A1* | 12/2007 | Balasubramanian | H04W 28/24 370/328 |
| 2007/0297329 | A1* | 12/2007 | Park | H04W 28/24 370/230.1 |
| 2009/0199268 | A1* | 8/2009 | Ahmavaara | H04L 63/20 726/1 |
| 2012/0134286 | A1* | 5/2012 | Bhalla | H04W 8/18 370/252 |
| 2013/0094435 | A1* | 4/2013 | Deng | H04W 24/02 370/315 |
| 2015/0078200 | A1* | 3/2015 | Kalkunte | H04L 45/302 370/254 |
| 2016/0249282 | A1* | 8/2016 | Zhou | H04W 4/24 |
| 2017/0048876 | A1* | 2/2017 | Mahindra | H04L 12/407 |
| 2017/0180259 | A1* | 6/2017 | Yu | H04W 40/20 |
| 2017/0317904 | A1* | 11/2017 | Rasanen | H04L 47/2475 |
| 2017/0331691 | A1* | 11/2017 | Zhou | H04L 69/16 |
| 2018/0123878 | A1* | 5/2018 | Li | H04L 41/5041 |
| 2018/0139107 | A1* | 5/2018 | Senarath | H04L 47/70 |
| 2018/0239615 | A1* | 8/2018 | Ravid | G06F 16/1794 |
| 2018/0352594 | A1* | 12/2018 | Iwai | H04L 47/825 |
| 2018/0375733 | A1* | 12/2018 | Zhou | H04L 12/1407 |
| 2019/0116521 | A1* | 4/2019 | Qiao | H04W 28/06 |
| 2019/0215729 | A1* | 7/2019 | Oyman | H04L 65/1016 |
| 2019/0238350 | A1* | 8/2019 | Zhou | H04L 12/1407 |
| 2019/0253917 | A1* | 8/2019 | Dao | H04W 76/27 |
| 2019/0254118 | A1* | 8/2019 | Dao | H04L 67/141 |
| 2019/0394279 | A1* | 12/2019 | Dao | H04W 48/04 |
| 2020/0050465 | A1* | 2/2020 | Ravid | G06F 9/4494 |
| 2020/0068439 | A1* | 2/2020 | Avula | H04L 67/141 |
| 2020/0204977 | A1* | 6/2020 | Panchal | H04W 76/12 |
| 2020/0221527 | A1* | 7/2020 | Bharatia | H04W 76/20 |
| 2020/0259904 | A1* | 8/2020 | Dao | H04W 40/02 |
| 2020/0404069 | A1* | 12/2020 | Li | H04L 67/59 |
| 2021/0004244 | A1* | 1/2021 | Ravid | G06F 16/24568 |
| 2021/0014157 | A1* | 1/2021 | Zhou | H04L 43/0817 |
| 2021/0058784 | A1* | 2/2021 | Kedalagudde | H04W 76/12 |
| 2021/0075631 | A1* | 3/2021 | Liao | H04M 15/8038 |
| 2021/0076250 | A1* | 3/2021 | Wang | H04W 28/0221 |
| 2021/0084523 | A1* | 3/2021 | Kucera | H04L 43/0864 |
| 2021/0112462 | A1* | 4/2021 | Zhu | H04W 36/0066 |
| 2021/0127302 | A1* | 4/2021 | Young | H04W 76/36 |
| 2021/0144063 | A1* | 5/2021 | Abboud | H04L 43/0876 |
| 2021/0153041 | A1* | 5/2021 | Parvataneni | H04L 43/065 |
| 2021/0160314 | A1* | 5/2021 | Parvataneni | H04L 9/3239 |
| 2021/0165664 | A1* | 6/2021 | Gould | G06F 16/9024 |
| 2021/0221247 | A1* | 7/2021 | Daniel | B60L 55/00 |
| 2021/0243641 | A1* | 8/2021 | Gangakhedkar | H04L 67/61 |
| 2021/0288886 | A1* | 9/2021 | Örtenblad | H04W 24/08 |
| 2021/0306844 | A1* | 9/2021 | Xue | H04W 92/20 |
| 2021/0352554 | A1* | 11/2021 | Barac | H04J 11/0056 |
| 2022/0038554 | A1* | 2/2022 | Merwaday | H04L 45/64 |
| 2022/0070876 | A1* | 3/2022 | Bangolae | H04W 4/40 |
| 2022/0086607 | A1* | 3/2022 | Ali | H04W 4/44 |
| 2022/0095093 | A1* | 3/2022 | Panchal | H04W 8/082 |
| 2022/0141662 | A1* | 5/2022 | Liao | H04W 12/08 726/1 |
| 2022/0190886 | A1* | 6/2022 | Islam | H04W 72/044 |
| 2022/0191733 | A1* | 6/2022 | Ali | H04L 43/16 |
| 2022/0256505 | A1* | 8/2022 | Qi | H04W 76/40 |
| 2022/0263724 | A1* | 8/2022 | Lair | H04L 43/0805 |
| 2022/0286876 | A1* | 9/2022 | Van Phan | H04W 24/04 |
| 2022/0286896 | A1* | 9/2022 | Wang | H04W 4/40 |
| 2022/0369112 | A1* | 11/2022 | Sharma | H04W 12/12 |
| 2023/0308853 | A1* | 9/2023 | Ding | H04W 4/40 |
| 2024/0007850 | A1* | 1/2024 | Liao | H04W 12/06 |
| 2024/0007901 | A1* | 1/2024 | Zhu | H04W 28/065 |
| 2024/0163894 | A1* | 5/2024 | Xiong | H04L 1/1854 |
| 2024/0205738 | A1* | 6/2024 | Shilov | H04W 4/70 |
| 2024/0333464 | A1* | 10/2024 | Barac | H04W 72/541 |

OTHER PUBLICATIONS

3rd Generation Partnership Project; Technical Specification Group Services and System Aspects; Study on architecture enhancements for EPS and 5G System to support advanced V2X services (Release 16), 3GPP Standard; Technical Report; 3GPP TR 23.786, 3rd Generation Partnership Project (3GPP), Mobile Competence Centre; 650, Route Des Lucioles ; F-06921 Sophia-Antipolis Cedex; France, vol. SA WG2, No. V0.10.0, Dec. 5, 2018 (Dec. 5, 2018), pp. 1-109, XP051591038.

International Search Report mailed Sep. 28, 2020 for International Application No. PCT/CN2020/071784.

Written Opinion mailed Sep. 28, 2020 for International Application No. PCT/CN2020/071784.

Office Action dated May 22, 2024 issued in Canadian Patent Application No. 3,164,167, 4 pgs.

Office Action issued in Chinese Patent Application No. 202080093178.9 dated May 21, 2025, w/English translation, 30 pages.

* cited by examiner

METHOD FOR ADAPTIVELY CONFIGURING TRANSMISSION OF DATA FLOWS

CROSS REFERENCE

This application is a continuation of and claims priority to International Patent Application No. PCT/CN2020/071784, filed Jan. 13, 2020, which is herein incorporated by reference in its entirety.

TECHNICAL FIELD

This disclosure is directed to adaptive configuration of data flow transmission parameters in a communication network.

BACKGROUND

A data transmission session in a communication network may include one or more data flows. A data flow within such a data transmission session may be associated with a set of transmission characteristics or requirements, such as Quality of Service (QoS) characteristics. Such transmission characteristics or requirements may be represented by a set of parameters specified as a transmission profile for the data flow. The communication network may configure a transmission of the data flow, e.g., allocating communication resources for the data flow, based on its transmission profile. Determination of the transmission profile may involve various network nodes, elements, or entities in the communication network and a multitude of signaling processes between these network nodes, elements, or entities. Traditional approaches for modifying the transmission profile according to changing network environment and conditions for the data flow may be cumbersome in implementation, delayed in time, and inefficient in utilization of the communication resources.

SUMMARY

This disclosure relates to methods, systems, and devices for adaptive configuration of parameters for data flow transmission in communication networks.

In some implementations, a method for configuring a set of transmission parameters for a data flow in a communication network is disclosed. The method may include determining, by a first network element of the communication network, two or more different configuration profiles for the data flow, each configuration profile comprising the set of transmission parameters as estimated by the first network element for the data flow; notifying, by the first network element, the two or more different configuration profiles to a second network element of the communication network separate from the first network element; causing, by the first network element, the second network element to select an active configuration profile from the two or more different configuration profiles; and causing, by the first network element, the communication network to configure transmission of the data flow based on the set of transmission parameters associated with the first configuration profile.

In some other implementations, a method for configuring a set of transmission parameters for a data flow in communication network is disclosed. The method may include receiving by a second network element of the communication network, two or more different configuration profiles for the data flow, wherein the two or more different configuration profiles are estimated by a first network element of the communication network and each configuration profile comprises a set of transmission parameters for the data flow; selecting, by the second network element, a first configuration profile from the two or more different configuration profiles as an active configuration profile; and causing, by second network element, the communication network to configure transmission of the data flow based on the set of transmission parameters associated with the first configuration profile.

In some other implementations, a network device is disclosed. The network device main include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above embodiments and other aspects and alternatives of their implementations are explained in greater detail in the drawings, the descriptions, and the claims below.

DETAILED DESCRIPTION

In a communication network, an end-to-end communication may be established as a data communication session (alternatively referred to as a data session, or a communication session). Each data session may include transmission of data of different types, characteristics, and transmission requirements. As such, a data session may be configured as containing multiple data flows, with each data flow including data having similar transmission characteristics and/or associated with similar transmission quality requirements. Transmission of each of these data flows may be controlled and configured base on its transmission characteristics/requirements. For examples, allocation of communication resource to the data flow by the communication network may be based on the transmission characteristics/requirements of the data flow.

Such transmission characteristics/requirements for the data flow may be used to determine a set of transmission parameters collectively referred to as a transmission profile for the data flow. The configuration of the transmission of the data flow (such as communication resource allocation) may then be based on such a transmission profile. The determination of a transmission profile may be performed by a network element in the communication network that is assigned for configuring and managing the transmission of the data flow. Such a network element, however, may not easily obtain some information that are relevant to the determination of the transmission profile for a particular data flow. Thus, such specific determination may not always be accurately made. Further, the network condition for the transmission of the data flow may change as a function of time while the data session is active. The network element responsible for determining the transmission profile for the data flow may not easily detect such changes in network condition and thus may not be in a position to adaptively adjust the transmission profile for the data flow in real-time. An adjustment of the transmission profile may be requested by other network elements in the communication network that can more easily detect the change of network condition. Such adjustment, however, may be significantly delayed and may require a significant amount of signaling overhead. A "network element" may include one or more network nodes, one or more network functions, and/or one or more network entities.

Figure 1:
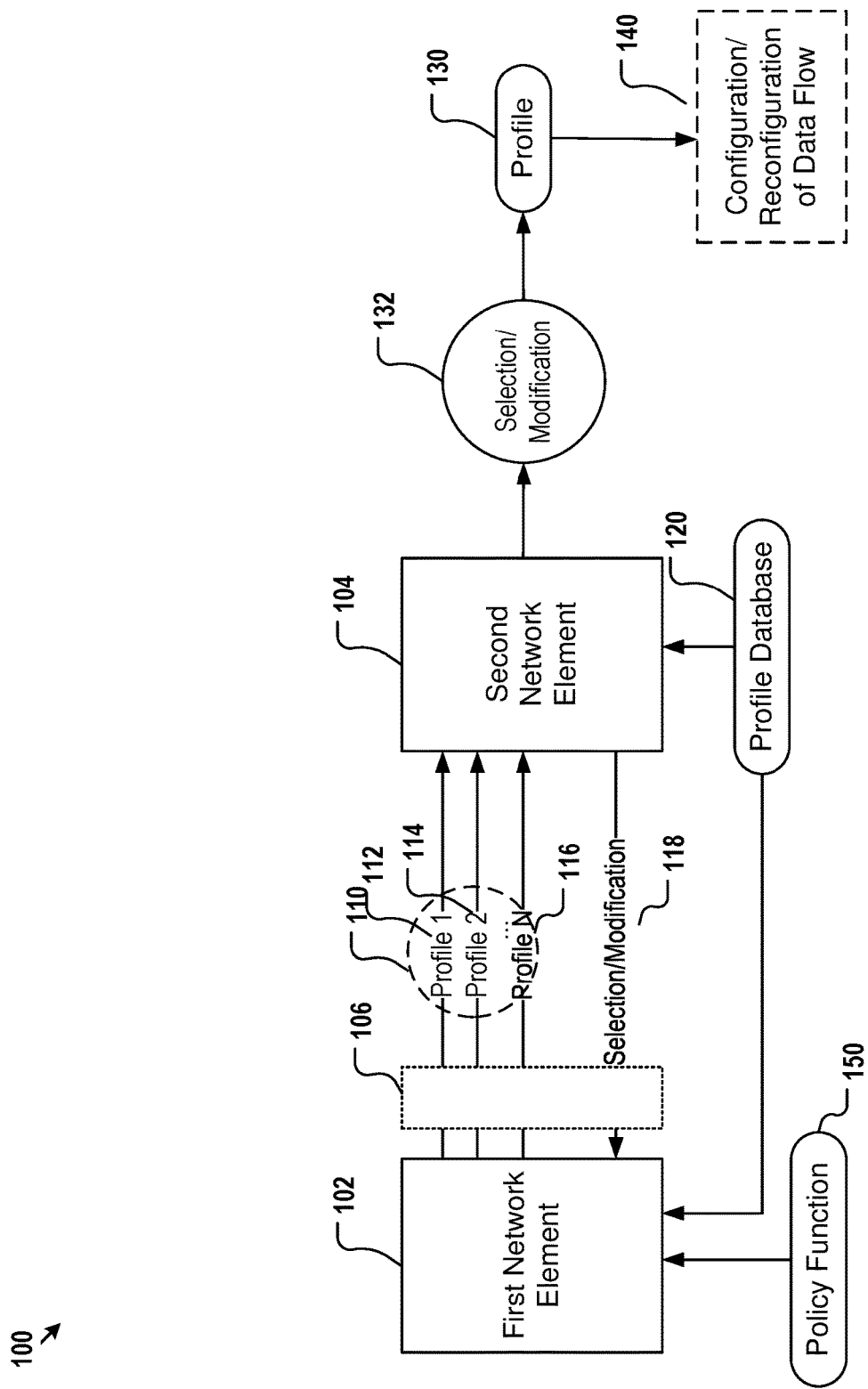
FIG. 1 shows an exemplary implementation for configuring transmission of a data flow in a communication network.

FIG. 1 illustrates an exemplary implementation 100 for adaptive configuration of transmission profile of a data flow in a communication network with reduced latency and reduced communication resource consumption. As shown in FIG. 1, rather than a single specific transmission profile, a first network element 102 in the communication network may be configured to determine a group of candidate transmission profiles as shown by 110, including individual transmission profiles 112, 114, and 116. The first network element 102, for example, may be in communication with a policy function 150. The determination of the group of transmission profiles 110 by the first network element 102 may be at least partially based on a set of policies and rules included in the policy function 150. A second network element 104 may be notified of the group of transmission profiles 110 by the first network element 102 via, for example, signaling between the first network element 102 and the second network element 104.

The second network element 104, upon being notified of the group of transmission profiles 110, may perform a selection 132 of an active transmission profile 130 from the group of transmission profiles 110 according to network condition as detected or derived by the second network element 104. The second network element 104 may further send a feedback of its selection of the transmission profile 130 as an active transmission profile for the data flow to the first network element 102 and/or other network elements in the communication network, as shown in 118, and may further cause a configuration of the transmission of the data flow by the communication network based on the selected transmission profile 130, as shown in 140.

After such configuration and while the transmission of the data flow is active, the second network element 104 may detect or derive changes in network condition associated with the data flow in real-time, adaptively modify its selection of the active transmission profile from the group of transmission profiles 110, and reselect a different transmission profile from the group of transmission profiles 110 as the active transmission profile for the data flow, as shown in 132. The second network element 104 may then send a feedback of such modification to the first network element 102 as shown in 118 and, and cause a reconfiguration of the transmission of the data flow by the communication network based on the modified or reselected transmission profile 130, as shown in 140.

As such, the implementation of FIG. 1 provides a mechanism for the second network element 104 to adaptively modify transmission profile 130 of an active data flow without having to send any separate request to the first network element 102 to have the first network element reevaluate, re-determine, or estimate a new transmission profile, and notify the second network element 104 of the new transmission profile. The implementation of FIG. 1 thus removes signaling between the first network element 102 and the second network element 104 for modification of the transmission profile and corresponding reconfiguration of the network, and thus reduces reconfiguration latency during active transmission of the data flow.

In the implementation of FIG. 1, the first network element 102 may be configured to access the policy function 150 in order to estimate and determine the group of candidate transmission profiles 110 for the data flow. The second network element 104 may be at a better location to more conveniently and accurately determine or detect real-time network conditions and state of transmission of the data flow and thus may be in better position to determine whether the active transmission profile needs to be modified. The implementation of FIG. 1 thus provides a collaborative scheme between the first network element 102 and the second network element 104 to achieve more efficient adaptive configuration and reconfiguration of the transmission profile of the data flow. In addition, the second network element 104 may be further configured to include data analytics capability for adaptive and intelligent selection of active transmission profile for the data flow based on historical information of data transmission monitored or collected by the second network element 104. Such data analytics capability, for example, may be based on technologies including but not limited to various artificial intelligence models and other model for big-data analytics.

In the exemplary implementation of FIG. 1, the communication of the transmission profiles 110 and the transmission profile selection and modification feedback 118 do not need to be direct. In some implementations, such communication may be relayed by other intermediate network element, as indicated by 106 in FIG. 1. Accordingly, such communication may involve more than one interfaces (e.g., more than one signaling interfaces).

Each of the transmission profiles 110 may be associated with information and parameters about a predetermined set of data transmission characteristics/requirements. Each of the set of data transmission profile parameters may be specified as a particular value, a value range, or upper/lower limit. In one example, each of data transmission profiles 110 may correspond to a Quality of Service (QoS) profile associated with information related to a predetermined set of characteristics, requirements, and/or parameters for a quality of service level.

In some implementations, a predetermined number of possible transmission profiles may be specified and the first network element 102 may determine the transmission profiles 110 among the predetermined possible transmission profiles. In these implementations, the predetermined possible transmission profiles may be specified in a profile database 120 which may be made accessible to the first network element 102 and the second network element 104. As such, the notification of the transmission profiles 110 from the first network element 102 to the second network element 104 and the feedback of the transmission profile selection from the second network element 104 to the first network element 102 may include transmission of profile identifiers rather than the actual profile contents. These transmission profile identifiers may be used to look up the transmission profile characteristics/requirements/parameters from the profile database 120 by the first network element 102 and the second network element 104. Further, the group of transmission profiles 110 may be assigned a group identifier associated with the data flow.

The transmission profile and the various parameters therein may be used by the communication network to configure or reconfigure the transmission of the corresponding data flow. Such configuration or reconfiguration may include but is not limited to communication resource allocation to support the transmission of the data flow. Such configuration may be made by any network element(s), network node(s), network function(s), or network entities in the communication network. For example, such configuration or reconfiguration may be made by the second network element. For another example, such configuration or reconfiguration may be made by the first network element. For yet another example, such configuration or reconfiguration may be made by a network node or function other than the first network element or second network element according to the transmission profile selected by the second network element.

The feedback 118 of the selection of transmission profile by the second network element may be further recorded or logged by the first network element or other network nodes, elements, entities, or databases in the communication network. Such recorded information may provide a historical reference data for the first network element to improve initial determination of the plurality of transmission profiles for the second network element to select from for data flows in future communication sessions.

Figure 2:
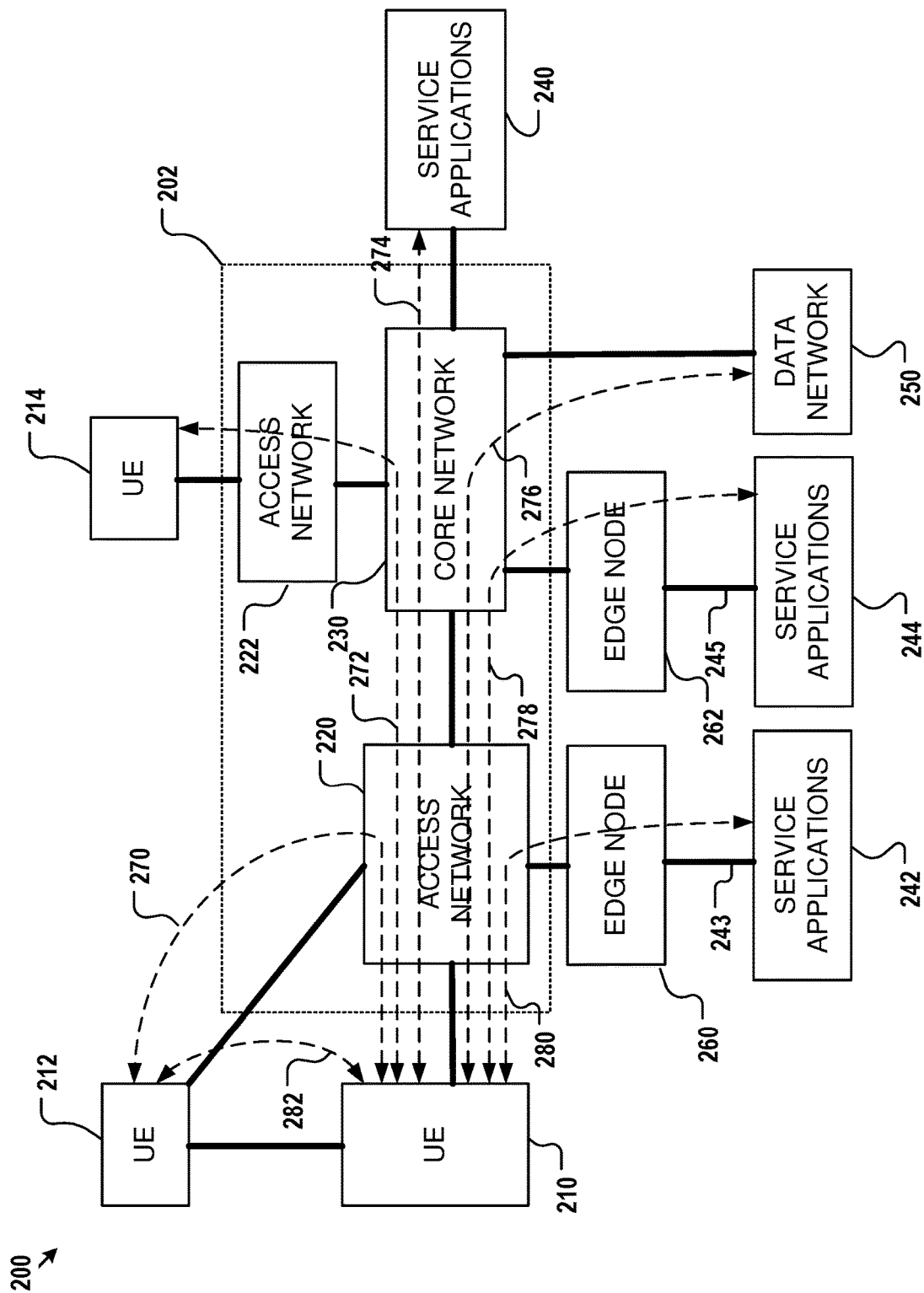
FIG. 2 illustrates an exemplary wireless communication network and exemplary communication sessions supported by the wireless communication network.

While the various examples below are based at least partially on wireless communication networks, the underlying principles of adaptive configuration of data flow transmission profile in the implementation illustrated in FIG. 1 are applicable to various other types of communication networks. FIG. 2 illustrates an exemplary wireless network 200 in which such underlying principles may be applied. The term "wireless network" is used herein to broadly refer to a communication network that at least partially involves over-the-air communication interfaces.

The exemplary wireless network 200 of FIG. 2 may include user equipments (UEs) 210, 212, and 214, a carrier network 202, various service applications 240, 242 and 244, and other data networks 250. The UEs 210, 212, and 214 may be implemented as network nodes comprising either mobile or fixed network devices, including but not limited to cellular phones, tablets, personal digital assistants, mobile computers, desktop computers, and Internet-of-Things devices such as connected smart home appliances, distributed sensor network nodes, and the like. The carrier network 202 may be configured to transmit voice, data, and other information (collectively referred to as data traffic) among UEs 210, 212, and 214, between the UEs and the service applications 240, 242 and 244, or between the UEs and the other data networks 250. The carrier network 202, for example, may include access networks 220 and 222, and a core network 230. The Access networks 220 and 222 may be configured to interact with and provide network access for the UEs on one side of a data path corresponding to a communication session and the core network 230. The core network 230, for example, may include various network nodes or functions configured to control communication sessions and perform network access management and data traffic routing. The service applications 240, 242 and 244 may be hosted by various application servers that are provided access to the access networks 220 and 222 and/or the core network 230, and are configured to provide services to the UEs 210, 212, and 214 through the access networks 220 and 222 and the core network 230. A service application 240, 242, or 244 may be deployed as a data network outside of the core network 230. Likewise, the other data networks 250 may be accessible by the UEs 210, 212, and 214 and other network functions through the core network 230.

The wireless network 200 may further include edge network nodes (alternatively referred to as edge nodes) 260 and 262. These edge network nodes, alone or in combination with other servers connected to and in association with the edge network nodes, may be configured to provide various distributed computing, storage, content hosting, and other services. The edge nodes 260 and 162, for example, may be implemented as mobile cloud nodes for mobile edge computing (MEC) or data storage. An edge node, such as the edge node 260 of FIG. 2, for example, may be deployed close to or along with network nodes within an access network, such as the access network 220. Likewise, an edge node such as the edge node 262 of FIG. 2 may be deployed close to or along with a network node within the core network 230. The edge nodes 260 and 262 may access the carrier network 202 via various capability and/or network exposure mechanisms. For example, the edge node 260 may be configured to access the access network 220 via capability and/or network exposure mechanisms offered by the access network 220. Likewise, the edge node 262 may be configured to access the core network 230 via capability and/or network exposure mechanisms offered by the core network 230. The edge nodes 260 and 262 may further be in communication with service applications such as 242 and 244 as shown by 243 and 245 to provide computing and storage services to the carrier network 202.

Continuing with FIG. 2, various end-to-end communication sessions may be established in the wireless network 200 upon requests by the various network devices. End-to-end communications sessions, for example, may be established between UEs 210, 212, and 214. For another example, end-to-end communication sessions may be established between UEs 210, 212, and 214 and service applications 240, 242, and 244, or data network 250. End-to-end communication sessions may also be established among the various service applications 240, 242, 244, and the data network 250 via the access networks 220 and 222 and/or the core network 230.

The dashed arrows in FIG. 2 illustrates various exemplary communication sessions involving the UEs 210, 212, and 214. For example, arrows 270 illustrates a communication session that may be established between UE 210 and 212 serviced by the same access network 220. Arrow 272 illustrates a communication session that may be established between UE 210 and UE 214 serviced by the different access network 220 and 222 connected by the core network 230. Arrow 274 illustrates a communication session that may be established between UE 210 and service application 240 via the access network 220 and the core network 230. Arrow 276 illustrates a communication session that may be established between UE 210 and data network 250 via the access network 220 and the core network 230. Arrow 278 illustrates a communication session that may be established between UE 210 and service applications 244 via the access network 220, the core network 230, and the edge node 262. Arrow 280 illustrates a communication session that may be established between UE 210 and service applications 242 via the access network 220 and the edge node 260. Finally, a direct-link communication session may be established between UE 210 and UE 212 without data relay by the access network 220, as shown by arrow 282. Each of these communication sessions, as shown in further detail below, may encompass various types of data flows having various data transmission characteristics and requirements.

Other communication sessions that do not involve a UE as a communication end device and are not explicitly shown in FIG. 2 may also be established. For example, communication sessions may be established among service applications, such as between service applications 242 and 244 via the access network 220, the core network 230 and the edge nodes 260 and 262. For another example, communication sessions may be established between service applications 242 with service applications 240 via the edge node 260, the access network 220, and the core network 230. For yet another example, communication sessions may be established between service applications 244 via the edge node 262 and the core network 230. These communication sessions may rely on network access provide by the carrier network 202 to third parties via, for example, capability and/or network exposure functions.

Figure 3:
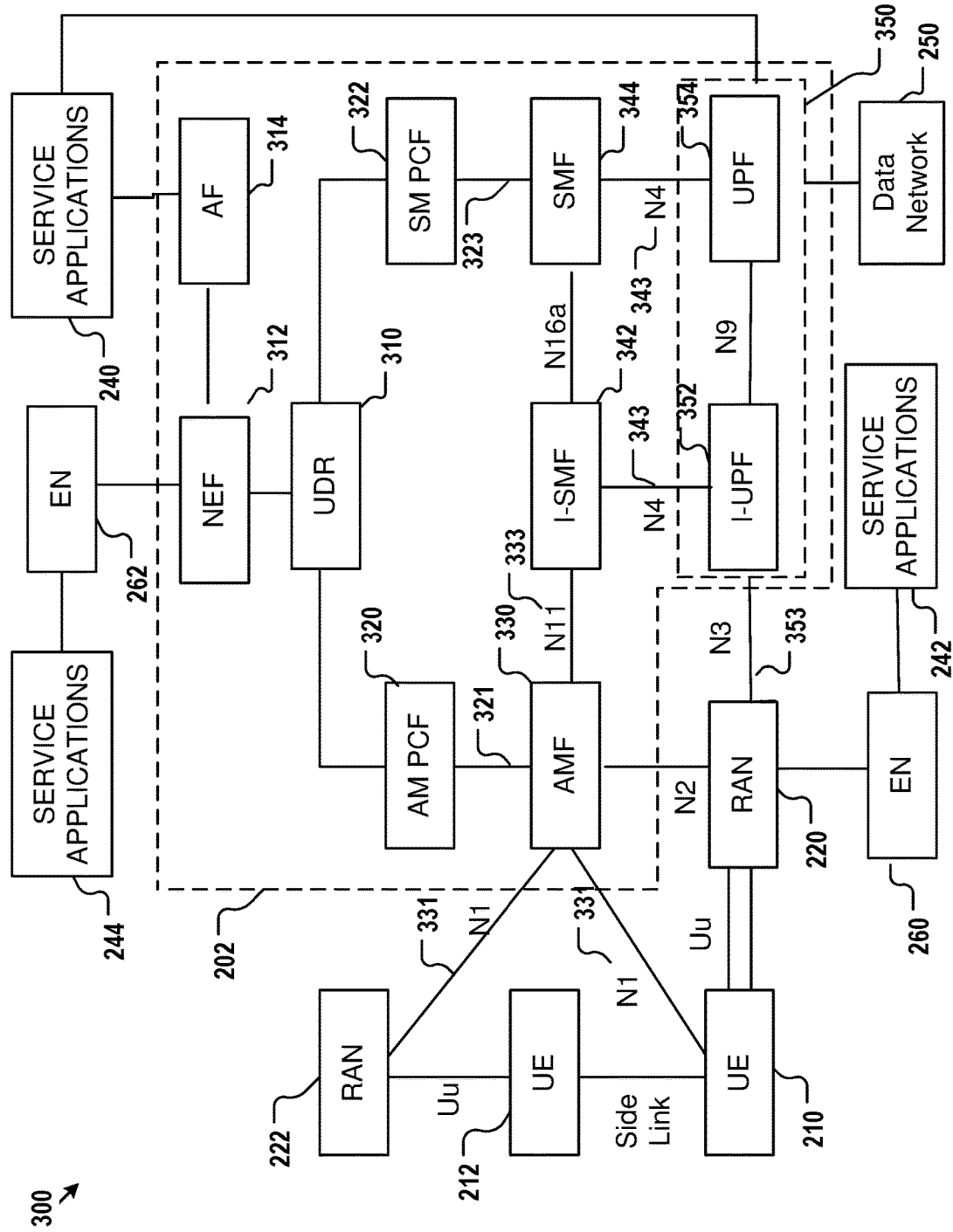
FIG. 3 illustrates an exemplary wireless communication network.

FIG. 3 further shows an example wireless network 300 illustrating various exemplary network functions or nodes, including access network nodes 220 and 222 in the form of radio access networks (RAN), UEs 210 and 212, edge nodes 260 and 262, applications 240, 242 and 244 hosted in application servers, and core network 202. The connectivity between these network components may be similar to that described in FIG. 2 and the disclosure above. The RANs 220 and 222, for example, may include a plurality of radio base stations or cells such as those implemented in various generations of cellular wireless networks. The communication between the UEs and the carrier network 202 may rely on over-the-air radio communication interfaces between the UEs and the RANs 220 and 222.

As shown in more detail in FIG. 3, the core network 202 of the wireless network 300 may include various network nodes or functions geographically distributed and interconnected to provide network coverage and data routing for a service region of the carrier network. These network nodes may be implemented as dedicated hardware network nodes. Alternatively, these network nodes may be virtualized and implemented as virtual machines or as software entities. These network nodes may each be configured with one or more types of network functions which collectively provide the provisioning and routing functionalities of the core network 202. While only single instances for some network functions of the core network 202 are illustrated in FIG. 3, those having ordinary skill in the art understand that each of these network functions may be instantiated as multiple instances of network nodes or elements that are distributed throughout the core network 202. Each of these network nodes or elements may provide/support one or more network functions of the core network. In the illustration of FIG. 3, the components of the core network 202 may be represented as either network nodes or functions. When a component is referenced as a network function, such a network function is implicitly implemented within a corresponding core network node. For simplicity, the terms "network node" and "network function" are used interchangeably.

For example, as shown in FIG. 3, the core network 302 may include application functions (AF) 314, network exposure functions (NEF) 312, and unified data repository (UDR) functions 310. The core network 202 my further include access and mobility management functions (AMF) 330, and session management functions (SMF or I-SMF, denoting intermediate SMF) 344 and 342. The AMF 330 and SMFs 344 and 342 may obtain communication policy information from separate access/mobility management policy control functions (AM PCF) 320 and session management policy control function (SM PCF) 322 via communication interface 321 and 323, respectively. The network nodes supporting the AM PCF functions and the AM PCF functions may contain or have access to the policy function 150 depicted in FIG. 1.

As further shown in FIG. 3, each of the SMFs and I-SMFs 322 and 344 controls one or more user plane functions (UPFs) 352 and 354. The RAN 220 and one or more UPFs may be allocated by the core network and form a carrier network portion of a data traffic network node pipeline (or alternatively, a data traffic path) for a particular communication session. The network nodes allocated to support the UPFs 352 and 354 for a particular communication session may serve as data routing network nodes for the communication session. The user plane functions may include one or more anchor UPFs (A-UPFs) 354 controlled by the SMFs 344 and one or more intermediate UPFs (I-UPFs) 352 controlled by the I-SMFs 342.

As shown in FIG. 3, the AMF 330 further communicates with the RANs 220 and 222, and the session management function I-SMF 342 or SMF 344, via interface 331 and 333, respectively. The AMF 330 may be responsible for provisioning registration, authentication, and access by a UE to the core network 202 as well as allocation of session management network nodes to support a particular UE communication session. The session management network nodes 342 and 344 allocated by the access AMF 330 in turn may be responsible for allocating data routing network nodes for UPF functions 352 and 354 for supporting the particular UE communication session and control these allocated data routing network nodes for the UPF functions 352 and 354 via communication interface 343. Data communication between the UPFs 352/354 and the RAN 220 may be based on communication interfaces 353. The UPFs 352 and 354 may form a user plane 350 for a communication session. The user plane 350 and the communication session may terminate at the data network 250 or for example, another remote RAN and a UE serviced by the remote RAN (not shown in FIG. 3, but illustrate in FIG. 2).

The NEF 312 provides the network exposure function to AF 314 for service applications 240 to access the core network 202 and to act as a communication end point of a communication session. Likewise, the edge node 262 may also be provided access the core network 202 via the NEF 312 and provide service for the service applications 244. As such, the edge node 262 may be considered as AF 314. The edge node 260 of FIG. 3, on the other hand, may directly access RAN 220 via capability/network exposure offered by RAN 220 to provide service applications 242.

The signaling and data exchange between the various types of network nodes through various communication interfaces indicated by the various connection lines in FIG. 3 may be carried by signaling or data messages following predetermined types of format or protocols. Some example communication interfaces as defined, for example, in the $5^{th}$ generation new radio wireless communication specifications, may be used in the communication network 300 between the various network nodes as indicated by the labels along the connection lines in FIG. 3, including the N1 interface 331 between the UE 210 and the AMF 330 via the RAN 220, the N2 interface between RAN 220 and the AMF 330, the N3 interface between the RAN 220 and the user plane 350, the N4 interface between the SMFs 342/344 and the UPFs 350, the N11 interface between the AMF 330 and the I-SMFs 342, and the N16a interface between the I-SMFs 342 and the SMFs 344.

Further description of the functionality of the various network nodes and network functions in the wireless communication network 300 of FIG. 3 are described in more detail below:

1) AMF (Access and Mobility Management function) 330. These network nodes perform the functionalities including but not limited to registration management, connection management of, reachability management and mobility management of UE 110. These network nodes also perform access authentication and access authorization. The AMF 330 may function as non-access stratum (NAS) security termination and relay the session management NAS messages between the UE 210 and SMFs 342 and 344. The AMF 330 also performs SMF selection function during communication session establishment procedure and UE mobility procedure.

2) SMF (Session Management Function) 344. These network nodes perform the functionalities including but not limited to establishment, modification, and release of communication sessions, UE IP address allocation and management (including optional authorization functions), selection and control of UPFs 350, and downlink data notification. Each SMF 344 can control one or more UPFs 354 and is associated with a service area being a collection of UPF service areas of all UPFs under its control.

3) I-SMF (Intermediate SMF) 342. An I-SMF that is inserted, changed or removed to a communication session as needed to control I-UPFs 352 which cannot be controlled by the original SMF 344 selected for the communication session because the they belong to a different SMF service area.

4) UPF (User plane function) 350. These network nodes perform the functionalities including but not limited to serving as an anchor point for intra-/inter-radio access technology (RAT) mobility, packet routing and forwarding, traffic usage reporting, quality of service (QoS) handling for the user plane, downlink packet buffering and downlink data notification triggering. A UPF service area includes an area consisting of one or more tracking areas within which a communication session associated with the UPF can be served by RAN nodes via a direct interface (e.g., N3 interface as shown in FIG. 3) between the RAN and the UPF without need to add a new UPF in between or to remove/re-allocate the UPF. An A-UPF (354 of FIG. 3) is an anchor UPF which is keep unchanged during the UE mobility. The intermediate UPF (I-UPF) may be inserted/relocated when the UE moves outside of the A-UPF service area. An I-UPF may use, e.g., N3 tunnel as indicated in FIG. 3, to connect with RAN 320 and may use, e.g., N9 tunnel as indicated in FIG. 3, to connect with A-UPF 354.

5) PCF (Policy Control Function) 320 and 322. These network nodes perform the functionalities including but not limited providing policy rules and controlling other network nodes to enforce the policy rules. Specifically the PCF provides access and mobility related policies to the AMF 330 so that the AMF 330 enforces them during mobility procedure. These PCFs are referred to as AM PCF (320 of FIG. 3). The AM PCF 320 further provides UE access selection and communication session selection related policies (UE policy) to AMF 330 for the AMF forward to UE 210. The PCFs may further provide session management related policies to the SMFs 344 for the SMFs to enforce. These PCFs may be referred to as SM PCFs (322 of FIG. 3). The AM PCFs 320 and the SM PCFs 322 may be deployed in a distributed manner and each PCF may support different AM or SM policy functions.

6) UDR (Unified Data Repository) 310. These network nodes may support the storage/retrieval of structured data for network exposure, application data (e.g., packet flow descriptions (PFDs) for application detection, application request information for multiple UEs, and application request for data traffic routing influence, as described above and in more detail below), and storage/retrieval of network group ID corresponding to subscriber identifier (e.g., External Group ID or Internal Group ID). A UDR 310 may be located in the same public land mobile network (PLMN) as network application service to which it provides application data storage.

7) NEF (Network Exposure Function) 312. These network nodes may store/retrieve information as structured data using a standardized interface (e.g., Nudr interface) to UDRs 310. The NEF 312 nay provide a means for the AFs to securely provide various information to the core network, including but not limited to information with respect to application influence on data traffic routing. The NEF 312 may authenticate, authorize and assist in throttling requests from the AFs. Access to NEF 312 may be through open APIs provided by the core network 302. A specific NEF instance may support one or more of these functionalities and consequently an individual NEF 312 may support a subset of the APIs specified for NEFs. An NEF 312 may be configured to access UDRs 310 located in the same PLMN as the NEF 312.

8) AF (Application Function) 314. These network nodes may interact with the core network 302 in order to provide services to applications. An AF 314 may interact with the application on one end and the network functions in the core network via NEF 312 on the other end. In some implementations, an AF 314 considered as trusted by the core network 302 may bypass the NEF 312 and interact directly with other relevant network functions in the core network 302.

Figure 4:
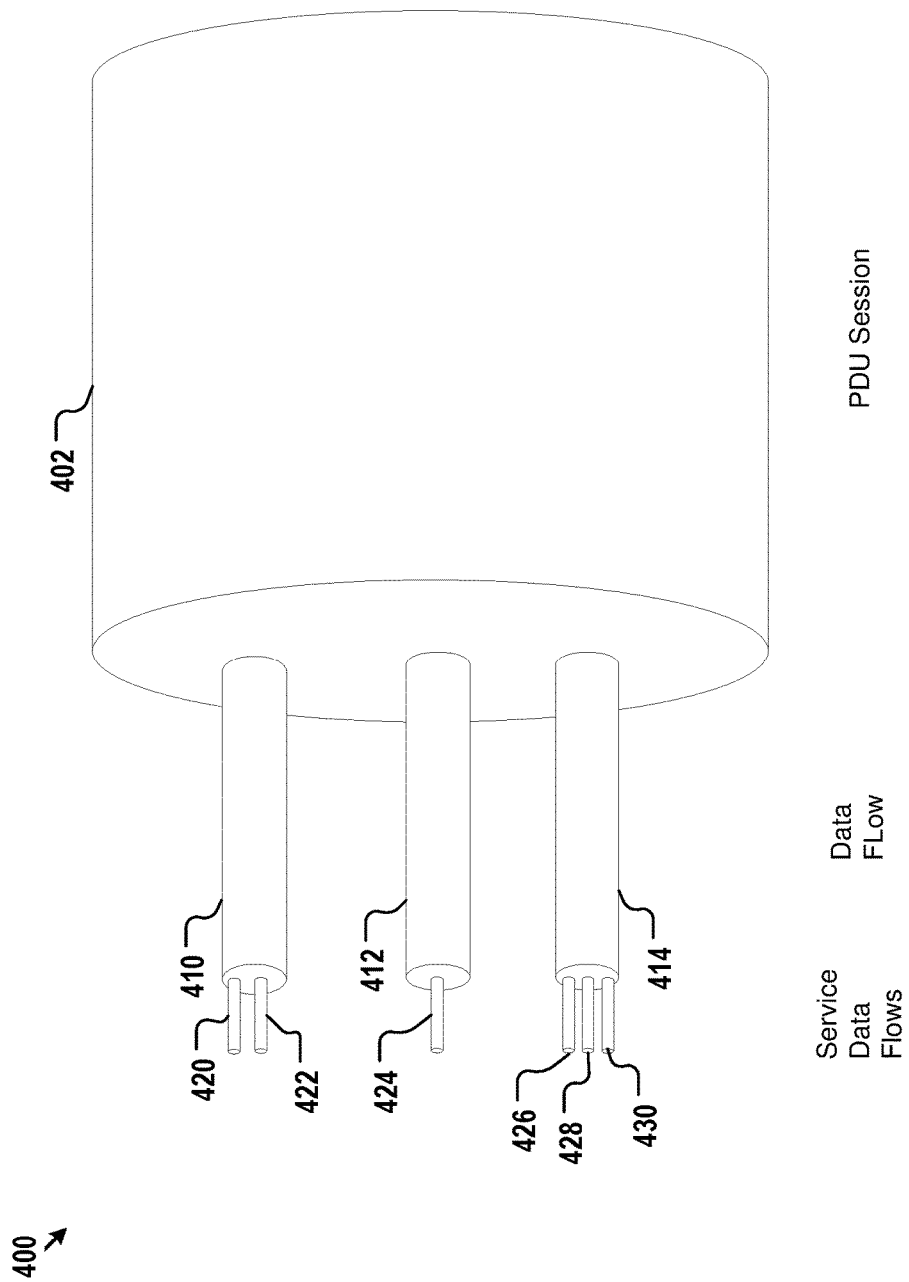
FIG. 4 illustrates Quality of Service (QoS) flows within a communication session in a communication network.

The communication session described above in relation to FIGS. 1-3 for an end-to-end communication may be established as a protocol data unit (PDU) session in the exemplary wireless communication network above. Such a PDU session is shown in 400 of FIG. 4 and forms a data pipe 402 for the communication session. Within the PDU session data pipe 402, data of different types and characteristics/transmission requirements (e.g., video, voice, text, etc.) may be included. Data of like characteristics may be grouped into data flows. For example, as illustrated in FIG. 4, data flows 410, 412, and 414 may be configured to transmit data of distinct characteristics/transmission requirements. In some implementations, each data flow may be further divided into sub flows or service data flows. For example, the data flow 412 of FIG. 4 may include a single service data flow 424, whereas the data flow 410 may include two service data flows 420 and 422, and the data flow 414 may include three service data flows 426, 428, and 430.

As described above with respect to FIG. 1, the characteristics/transmission requirements of the data flows 410, 412 and 414 may be reflected in transmission profiles associated with these data flows. An example of the transmission profile may be a QoS profile, which specifies parameters and rules for the quality of service requirements associated with a corresponding data flow. In some implementations, communication resource allocation and configuration by the communication network for a data flow may be based at least in part on its transmission profile such as QoS profile. Data flows based on QoS profiles may be referred to as QoS flows. Data flows 410, 412 and 414 may represent the lowest granularity for such communication resource allocation and configuration. In other words, all data transmission within a particular data flow would be allocated with the same communication resources (e.g., data radio bearer) and network access control. In some implementations, different data flows may share a same communication resource allocation. For example, while data flow 414 may be allocated with a first communication resource (e.g., a first data radio bearer), the data flow 410 and data flow 412 may be both allocated with a same second communication resource (e.g., a second data radio bearer).

The adaptive configuration of transmission profile described in relation to FIG. 1 may be applied to the data flows illustrated in FIG. 4 in the exemplary wireless network depicted in FIGS. 2-3. For example, for a particularly data flow such as a QoS flow, a first network element in the communication network 200 or 300 may determine a plurality of set of QoS profiles and communicate these candidate QoS profiles to a second network element in the communication network 200 or 300. The second network element may select one QoS profile from the plurality of QoS profiles based on network conditions detected or derived at the second network element for configuring the transmission of the QoS flow by the communication network. The configuration of the transmission of the QoS flow may be performed by any network node(s) or function(s) in the communication network. The second network element may further notify the first network element of its selection of the QoS profile. As described above in relation to FIG. 1, such a feedback notification may include QoS identifier assigned to the selected QoS profile. After an initial selection of the QoS profile and while the QoS flow is active, the second network element may further modify its selection of the QoS profile for the QoS flow based on changes in the network condition to select another QoS profile from the plurality of QoS profiles provided by the first network element and send a feedback to the first network element to notify the first network element of such modification. In such a manner, QoS profile for the QoS flow may be configured adaptively with low latency and decreased amount of signalling between the network nodes in the communication network 200 of FIG. 2 or 300 of FIG. 3.

As described above in relation to FIG. 1, the QoS profiles may each include a set of QoS parameters and/or rules. For each QoS profile, these QoS parameters may either be specified as particular values, value ranges, or value limits (e.g., maximum or minimum values for the QoS parameters). The QoS parameters, for example, may include but are not limited to one or more of allocation and retention priority (ARP) parameters, and various bit rates such as a guaranteed flow bit rate (GFBR), a maximum flow bit rate (MFBR), an aggregate maximum bit rate (AMBR), and maximum packet loss rate (MPLR), resource type, priority level, packet delay budget (PDB), packet error rate (PER), average window, maximum data burst volume (MDBV), and the like.

Alternative to selecting by the second network element one QoS profile from the candidate QoS profiles provided from the first network element, the second network element may determine values for one or more QoS parameters compatible with the candidate QoS profiles provided from the first network element. The second network element accordingly may send as feedback values of the one or more QoS parameters to the first network element, rather than identifier of a selected QoS profile.

In some implementations, the first network element in FIG. 1 may be implemented as one or more of the core network, any of the RANs, any edge network node, any network node for the service applications of FIGS. 2 and 3, or any other network entity of the communication network. Further, the second network element in FIG. 1 may be implemented as one or more of any of the RANs, any edge network node, any network node for the service applications of FIGS. 2 and 3, or any other network entity of the communication network.

In some implementations, the first network element may be implemented as the core network 230 and the second network element may be the RAN 220 of FIG. 2 or FIG. 3. The RAN 220, after receiving the plurality of candidate QoS profiles from the first network element, may perform a selection from the plurality of the candidate QoS profiles or determine at least one QoS parameter value compatible with the plurality of candidate QoS profiles. Such a selection or determination, for example, may be performed by a service data adaptation protocol (SDAP) layer within the RAN 220. The communication network may then configure the transmission of the QoS flow according to the selected QoS profile or QoS parameter values. For example, the RAN 220 may then configure the QoS flow based on the selected QoS profile or QoS parameter values. In particular, RAN 220 may perform radio bearer allocation for the QoS flow based on the selected QoS profile or QoS parameter such that the QoS flow may be transmitted according to the quality of service requirements implicated in the selected QoS profile or QoS parameter values. For another example, the RAN 220 may feed back the selection of the QoS profile to the core network, e.g., the SMF, as a reference for the core network to perform configuration of the transmission of the QoS flow. In these exemplary implementations, the network nodes in the core network 230 acting as the first network element may include but are not limited to, for example, an SMF 344 of FIG. 3 that are allocated to manage the QoS flow. The SMF 344 may communicate with the SM PCF 322 as indicated by 323 of FIG. 3 to obtain various policies related to the QoS flow and may thus conveniently determine the plurality of candidate QoS profiles for the QoS flow. The RAN 220, on the other hand, may be in a better position to determine the real-time wireless network condition between the RAN and end UE of the QoS flow, and may thus be able to make better selection of an active QoS profile or determination of particular QoS parameter values based on the plurality of candidate QoS profiles. In such a manner, inaccurate single QoS profile estimate by the core network for the QoS flow may be replaces with a more flexible range, and more accurate real-time adaptive selection of the QoS profile or parameters may be made by the RAN. As such, data transmission loss may be reduced and user experience may be improved.

The exemplary implementations above, where the core network 230 acts as the first network element and the RAN 220 acts as the second network element, may be applicable to QoS flows within various end-to-end communication sessions involving the RAN 220 and the core network 230 in FIG. 2, including but not limited to the UE-to-UE communication session 272, the UE-to-service application communication session 274, the UE-to-data network communication session 276, and the UE-to-service application communication session 278.

In some other implementations, the first network element may be implemented as the core network 230 and the second network element may be the edge node 262 of FIG. 2 or FIG. 3. The edge node 262, after receiving the plurality of candidate QoS profiles from the first network element (the core network 230), may utilize, for example, various data analytics technologies, including but not limited to artificial intelligence and other big data analytics models, to select one QoS profile from the plurality of the candidate QoS profiles or to determine at least one QoS parameter value compatible to the plurality of the candidate QoS profiles. Such selection of QoS profile or particular QoS parameters may be used to configure the QoS flow by the communication network. For example, the selected profile or QoS parameters may be fed back to the core network which may cause the RAN (if the QoS flow involves UE 210 as an end device) to perform radio air bearer allocation for the QoS flow based on the selected QoS profile or QoS parameter such that the QoS flow may be transmitted according to the quality of service requirements implicated in the selected QoS profile or QoS parameter values. In these exemplary implementations, the network nodes in the core network 230 acting as the first network element may include but are not limited to, for example, an SMF 344 of FIG. 3 that are allocated to manage the QoS flow. The SMF 344 may communicate with the SM PCF 322 as indicated by 323 of FIG. 3 to obtain various policies related to the QoS flow and may thus conveniently determine the plurality of candidate QoS profiles for the QoS flow. The edge node 262, on the other hand, may possess a data analytics capability of intelligently predict a more appropriate active QoS profile or particular QoS parameter values. In these implementations, the edge node 262 may be connected to the NEF 312 of the core network in FIG. 3 as an AF based on capability/network exposure function provided by the core network. The edge node 262 may be configured as MEC.

The exemplary implementations above, where the core network 230 acts as the first network element and the edge node 262 acts as the second network element, may be applicable to QoS flows within various end-to-end communication sessions involving the RAN 220 and the core network 230 in FIG. 2, including but not limited to the UE-to-service application communication session 278. In a variation of these implementations, the second network element may be an application server associates with the service applications 244 rather than the edge node 262. Accordingly, the selection and determination of the active QoS profile or particular QoS parameters based on the candidate QoS profiles provided by the core network may be made by such an application server.

In some other implementations, the first network element may be implemented as the core network 230 and the second network element may be the edge node 260 of FIG. 2 or FIG. 3. The edge node 260 may be configured to access the RAN 220 via capability/network exposure function provided by the RAN 220. The first network element (the core network) may communicate the plurality of candidate QoS profiles to the edge node 260 via the RAN 220. After receiving the plurality of candidate QoS profiles from the core network 230, the edge node may utilize, for example, data analytics technologies, including but not limited to artificial intelligence and other big data analytics models, to select one QoS profile from the plurality of the candidate QoS profiles or to determine at least one QoS parameter value compatible to the plurality of the candidate QoS profiles. Such selection of QoS profile or particular QoS parameters may be used to configure the QoS flow by the communication network. For example, the selected profile or QoS parameter values may be fed back to the RAN 220 and the core network for configuring the transmission of the QoS flow. For example, the RAN 220 may then perform data radio bearer allocation for the QoS flow (if UE 210 is involved as an end device in the QoS flow) based on the selected QoS profile or QoS parameter values such that the QoS flow may be transmitted according to the quality of service requirements implicated in the selected QoS profile or QoS parameter values. In these exemplary implementations, the network nodes in the core network 230 acting as the first network element may include but are not limited to, for example, an SMF 344 of FIG. 3 that are allocated to manage the QoS flow. The SMF 344 may communicate with the SM PCF 322 as indicated by 323 of FIG. 3 to obtain various policies related to the QoS flow and may thus conveniently determine the plurality of candidate QoS profiles for the QoS flow. The edge node 260, on the other hand, may possess a capability of intelligently predict a more appropriate active QoS profile or particular QoS parameter values.

The exemplary implementations above, where the core network 230 acts as the first network element and the edge node 260 acts as the second network element, may be applicable to QoS flows within various end-to-end communication sessions involving the RAN 220 and the edge node 260 in FIG. 2, including but not limited to the UE-to-service application communication session 280. In a variation of these implementations, the second network element may be an application server associates with the service applications 242 rather than the edge node 260. Accordingly, the selection and determination of the active QoS profile or particular QoS parameters based on the candidate QoS profiles provided by the core network may be made by an application server.

In some other implementations, the first network element may be implemented as the core network 230. The first network element (the core network 230) may communicate the plurality of candidate QoS profiles to the RAN 220 involved in the QoS flow. The RAN 220 may detect the network condition and select a subset of QoS profiles from the plurality of candidate QoS profiles. The RAN 220 may further communicate the subset of the QoS profiles to the edge node 260 involved in the QoS flow. The edge node 260 may then performed another selection of one QoS profile from the subset of QoS profiles. The edge node 260 may then feed back the selection of the QoS profile to the RAN 220 which may further feed back the selection to the first network element (the core network 230). In such a manner, both the RAN 220 and the edge node 260 involved in the data flow may participate in the selection of the QoS profile from the plurality of candidate QoS profiles provided by the first network element based on detection of network condition and data analytics capabilities. In other words, the RAN 220 and the edge node 260 may collaboratively act as the second network element. After the selection of the QoS profile, the communication network (e.g., the RAN 220) may configure the transmission of the QoS flow based on the selected QoS profile. Such implementations may be applicable to QoS flows within various end-to-end communication sessions involving the RAN 220 and the edge node 260, including but not limited to the UE-to-service application communication session 280.

The selection of a QoS profile from the plurality of QoS profiles determined by the first network element may be performed by other network elements of FIG. 2 acting as the second network element. For example, the edge node 260 or 262 may first select a subset of QoS profiles from the plurality of QoS profile determined by the first network element (e.g., the core network 230). The edge node 260 or 262 may then transmit the selected subset of QoS profiles to the service applications 242 or 244. The service applications 242 or 244 may further select one QoS profile from the subset of QoS profiles. The service applications 242 or 244 may then feed back the selection of the QoS profile to the edge node 260 or 262 which may further feed back the selection to the first network element. After the selection of the QoS profile, the communication network (e.g., the RAN 220) may configure the transmission of the QoS flow based on the selected QoS profile. Such implementations may be applicable to QoS flows within various end-to-end communication sessions involving the edge node 260 or 262 and the service applications 242 or 244, including but not limited to the UE-to-service application communication sessions 278 and 280.

In some other implementations applicable to, for example, UE mobility scenarios, a source base station or cell may receive a plurality of QoS profiles from the core network (for example, from SMF) for a QoS flow, and may further transmit these QoS profiles to a destination base station or cell for the UE mobility. The destination base station or cell may then select one QoS profile or determine particular QoS parameter values based on the plurality of the QoS profiles for the QoS flow.

In some other implementations applicable to dual connectivity scenario, a macro cell in the RAN may receive a plurality of QoS profiles from the core network (for example, from SMF) for a QoS flow, and may further transmit these QoS profiles to a small cell. The small cell may then select one QoS profile or determine particular QoS parameter values based on the plurality of the QoS profiles for the QoS flow.

In some other implementations applicable to direct UE link scenario, a first UE may receive a plurality of QoS profiles from an RAN for a direct-link QoS flow, and may further transmit these QoS profiles to a second UE. The second UE may then select one QoS profile or determine particular QoS parameter values based on the plurality of the QoS profiles for the QoS flow.

In some other implementations applicable to MEC scenario, a source edge node for MEC may receive a plurality of QoS profiles from an RAN or from the core network via capability/network exposure function for a QoS flow, and may further transmit these QoS profiles to a destination edge node for MEC. The destination edge node may then select one QoS profile or determine particular QoS parameter values based on the plurality of the QoS profiles for the QoS flow.

In each of the implementations above, the QoS profile or QoS parameters selected or determined by the second network element may be communicated as a feedback to the first network element. For example, for some of the implementations above, the feedback may be sent to the core network (the SMF 344, for example) by the RAN 220. In some of the implementations above, the feedback may be sent directly to the core network (the SMF 344, for example) by the edge node 262. In some of the implementations above, the feedback may be sent to the core network (the SMF 344, for example) by the edge node 260 via the RAN 220. In some of the implementations above, the feedback may be sent to the core network (the SMF 344, for example) by the UE 210 via the RAN 220. In some of the implementations above, the feedback may be sent to one UE from another UE via UE-UE communication interface (such as PC5). In some of the implementations above, the feedback may be sent to one edge node from another edge node. In some of the implementations above, the feedback may be sent to one RAN from another RAN. The feedback above may be achieved using direct or indirect signalling between the first network element and the second network element.

The feedback information once received by the second network element, may be sent to various network management nodes for record keeping. These historical records may be used as basis for the communication network, e.g., the SMF 344, to determine future QoS profile recommendations, and for developing better QoS profile selection models.

As descripted above, the RAN 220 may use the QoS profile selection or QoS parameter determination for resource allocation for the QoS flow, including but not limited to data radio bearer allocation. The selection of QoS profile or determination of the QoS parameters for the QoS flow may be made by the RAN 220 as the second network element. Alternatively, the RAN may be notified of these QoS profile selection and QoS parameter determination in the feedback process.

In some implementations, as described above with relation to FIG. 1, a predetermined number of possible QoS profiles may be specified and the first network element may determine plurality of QoS profiles among the predetermined possible QoS profiles. In these implementations, the predetermined possible QoS profiles may be specified in the QoS profile database which may be made accessible to the first network element and the second network element. As such, the notification of the plurality of QoS profiles from the first network element to the second network element and the feedback of the selection of active QoS profile from the second network element to the first network element may include QoS identifiers rather than the actual QoS profile contents. These QoS profile identifiers may be used to look up the QoS profile characteristics/requirements/parameters from the QoS profile database by the first network element and the second network element. A QoS profile identifier may be referred to as a QoS Flow ID (QFI). Further, the group of QoS profiles determined by the first network element may be assigned a group identifier associated with the QoS flow.

Figure 5:
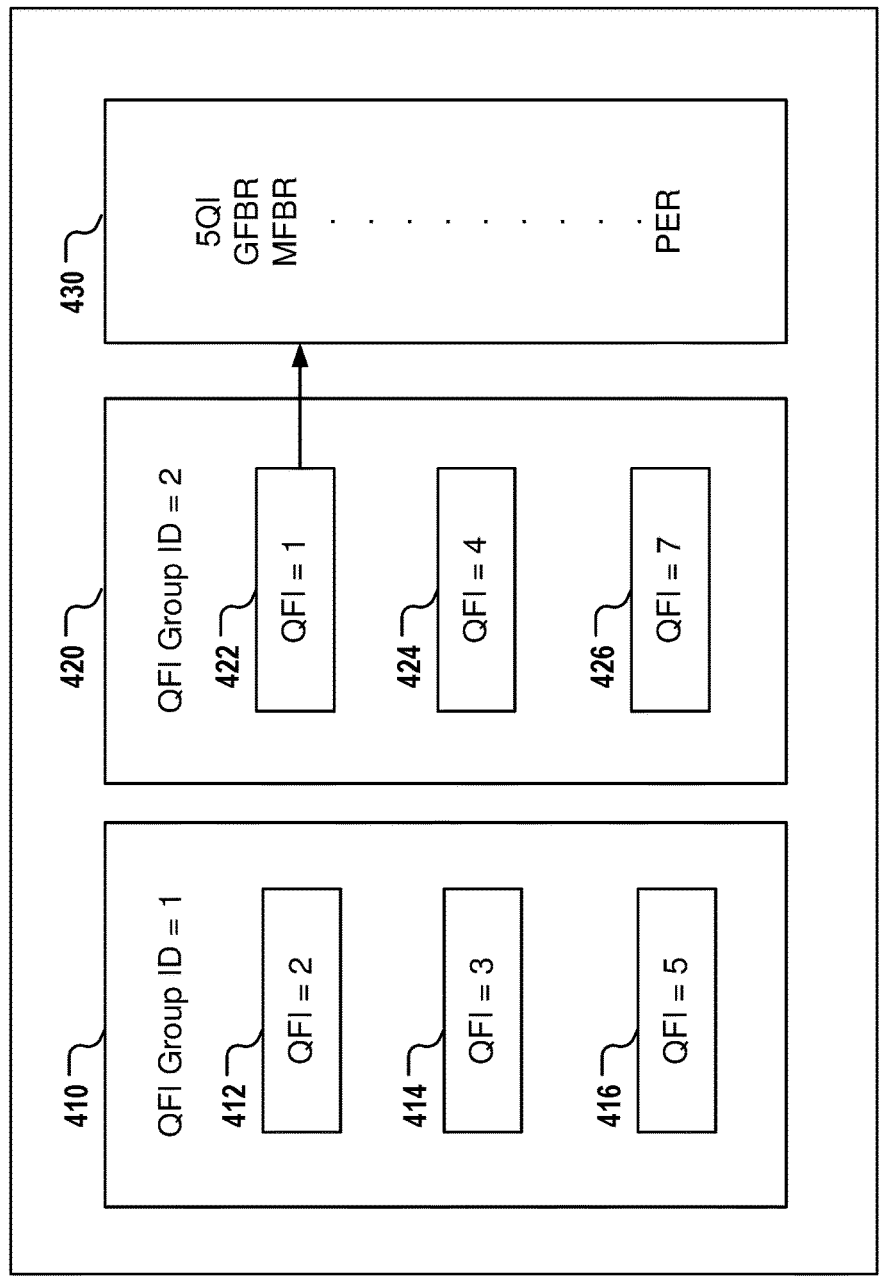
FIG. 5 illustrates an exemplary scheme for identification and specification of QoS flow parameters in a communication network.

The above implementation for identifying QoS profiles is illustrated in FIG. 5. Specifically, as shown in FIG. 5, each QoS flow is associated with a group ID for the QFIs included in each group, such as 410 and 420. Each group includes plurality of QFIs. For example, QFI group 410 may include QFIs 412, 414 and 416, whereas QFI group 420 may include QFIs 422, 424 and 426. Each QFI corresponds to a set of QoS parameters with values or ranges that may be looked up in the QoS profile database, as shown by 430.

In some implementations, the second network element may provide recommendation of QoS profile to the communication network. This may be particularly advantageous when none of the plurality of QoS profiles provided by the first network element for the data flow is appropriate. The recommendation may be provided as a feedback to the communication network such that the first network element may better estimate the plurality of QoS profiles in the future. For example, second network element may be the RAN and the recommended QoS profile may be transmitted to the core network via a user equipment feedback to the core network.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for configuring a set of transmission parameters for a data flow in a wireless communication network, comprising:
    determining, by a first network element of the wireless communication network, two or more different configuration profiles for the data flow, each configuration profile comprising the set of transmission parameters as estimated by the first network element for the data flow, wherein the first network element comprises a first access network of the wireless communication network;
    notifying, by the first network element, the two or more different configuration profiles to a second network element of the wireless communication network separate from the first network element, wherein the second network element comprises a second access network of the wireless communication network, and wherein notifying the two or more different configuration profiles to the second network element involves at least notifying by the first access network the two or more different configuration profiles to the second access network;
    causing, by the first network element, the second network element to select an active configuration profile from the two or more different configuration profiles; and
    causing, by the first network element, the wireless communication network to configure transmission of the data flow based on the set of transmission parameters associated with the active configuration profile.

2. The method of claim 1, wherein:
    the first access network comprises a source access network node which transmits the two or more different configuration profiles to a destination access network node during user equipment mobility, or a macro cell which transmits the two or more different configuration profiles to a small cell during a dual connectivity; and
    the second access network comprises the destination access network node which receives the two or more different configuration profiles from the source access network node during the user equipment mobility, or the small cell which receives the two or more different configuration profiles from the macro cell during the dual connectivity.

3. The method of claim 1, wherein: the first network element further comprises a core network of the wireless communication network; and the second network element further comprises:
    an edge network node connected to the core network via a capability exposure mechanism provided by the core network or via an access network using a capability exposure mechanism provided by the access network; or
    an application service node connected to the core network via the edge network node; or
    a destination site during user equipment mobility from a source site to the destination site of the wireless communication network, the two or more different configuration profiles being transmitted from the core network to the destination site via the source site; or
    a small cell of the wireless communication network, the two or more different configuration profiles being transmitted from the core network or to the small cell via a macro cell of the wireless communication network during a dual connectivity.

4. The method of claim 1, wherein:
the first network element further comprises a first user equipment connected to the first access network of the wireless communication network;
the second network element further comprises a second user equipment; and
the first user equipment obtains the two or more different configuration profiles from the first access network.

5. The method of claim 1, wherein:
the first network element further comprises a first edge node connected to the first access network or a core network of the wireless communication network via capability exposure mechanisms provided by the wireless communication network; and
the second network element further comprises a second edge network node.

6. The method of claim 1, wherein:
the second network element further comprises an edge network node connected to the first access network via capability exposure mechanisms provided by the wireless communication network.

7. The method of claim 1, wherein the two or more different configuration profiles comprise Quality of Service (OoS) profiles.

8. The method of claim 7, further comprising receiving, by the first network element, a QoS profile identifier of the active configuration profile from the second network element as a feedback.

9. A method for configuring a set of transmission parameters for a data flow in a wireless communication network, comprising:
receiving by a second network element of the wireless communication network comprising a second access network of the wireless communication network, two or more different configuration profiles for the data flow, wherein the two or more different configuration profiles are estimated by a first network element of the wireless communication network comprising a first access network of the wireless communication network, wherein each configuration profile comprises a set of transmission parameters for the data flow, and wherein receiving the two or more different configuration profiles by the second network element involves at least receiving the two or more different configuration profiles by the second access network from the first access network;
selecting, by the second network element, a first configuration profile from the two or more different configuration profiles as an active configuration profile; and
causing, by second network element, the wireless communication network to configure transmission of the data flow based on the set of transmission parameters associated with the first configuration profile.

10. The method of claim 9, further comprising feeding back, by the second network element, the selection of the first configuration profile to the first network element.

11. The method of claim 9, wherein:
the first network element further comprises a core network of the wireless communication network; and
the second network element further comprises:
a service data adaptation entity for selecting the first configuration profile from the two or more different configuration profiles, the second access network comprising a service data adaptation entity for selecting the first configuration profile from the two or more different configuration profiles; or an edge network node connected to the core network via a capability exposure mechanism provided by the core network; or
an application service node connected to the core network via an edge network node or the second access network; or
the edge node connected to the core network via the second access network using a capability exposure mechanism provided by the second access network; or
a destination cell of the wireless communication network, the two or more different configuration profiles being transmitted from the core network to a destination cell via a source cell; or
a small cell of the wireless communication network, the two or more different configuration profiles being transmitted from the core network to the small cell via a macro cell of the wireless communication network.

12. The method of claim 9, wherein:
the first network element further comprises a first user equipment connected to the first access network of the wireless communication network;
the second network element further comprises a second user equipment; and
the first user equipment obtains the two or more different configuration profiles from the first access network.

13. The method of claim 9, wherein
the first network element further comprises a first edge node connected to the first access network or a core network of the wireless communication network via capability exposure mechanisms provided by the wireless communication network; and
the second network element further comprises a second edge network node.

14. The method of claim 9, wherein:
the first network element further comprises a source access network node which transmits the two or more different configuration profiles to a destination access network node during user equipment mobility, or a macro cell which transmits the two or more different configuration profiles to a small cell during a dual connectivity; and
the second network element further comprises an edge network node connected to the second access network via capability exposure mechanisms provided by the wireless communication network, or the destination access network node which receives the two or more different configuration profiles from the source access network node during the user equipment mobility, or the small cell which receives the two or more different configuration profiles from the macro cell during the dual connectivity.

15. The method of claim 9, wherein:
the first network element further comprises one of a core network of the wireless communication network; and
the second network element further comprises an edge node and a service application node of the wireless communication network, the edge node being configured to select a subset of configuration profiles from the two or more different configuration profiles and the service application node is configured to select from the subset of configuration profiles the first configuration profile as the active configuration profile.

16. The method of claim 9, wherein the two or more different configuration profiles comprise Quality of Service (QOS) profiles.

17. The method of claim 16, wherein receiving, by the second network element of the wireless communication network, the two or more different configuration profiles comprises receiving, by the second network element, a QoS group identifier and a set of QoS profile identifiers.

18. The method of claim 9, further comprising:
modifying, by the second network element and during the transmission of the data flow, the active configuration profile from the first configuration profile to a second configuration profile among the two or more different configuration profiles;
causing, by the second network element, the wireless communication network to reconfigure the transmission of the data flow according the second configuration profile; and
feeding back, by the second network element, the modification from the first configuration profile to the second configuration profile to the first network element.

19. The method of claim 9, further comprising:
detecting by the second network element a network condition for the data flow;
generating, by the second network element, a recommended transmission profile distinct from the two or more different configuration profiles; and
feeding back, by the second network element, the recommended transmission profile to a core network of the wireless communication network.

20. A network device for configuring a set of transmission parameters for a data flow in a wireless communication network, comprising one or more processors and one or more memories, wherein the one or more processors are configured to read computer code from the one or more memories to implement a method, comprising:
determining, by a first network element of the wireless communication network, two or more different configuration profiles for the data flow, each configuration profile comprising the set of transmission parameters as estimated by the first network element for the data flow, wherein the first network element comprises a first access network of the wireless communication network;
notifying, by the first network element, the two or more different configuration profiles to a second network element of the wireless communication network separate from the first network element, wherein the second network element comprises a second access network of the wireless communication network, and wherein notifying the two or more different configuration profiles to the second network element involves at least notifying by the first access network the two or more different configuration profiles to the second access network;
causing, by the first network element, the second network element to select an active configuration profile from the two or more different configuration profiles; and
causing, by the first network element, the wireless communication network to configure transmission of the data flow based on the set of transmission parameters associated with the active configuration profile.

* * * * *